April 30, 1946.  L. R. BUCKENDALE ET AL  2,399,201
POWER TRANSMITTING MECHANISM
Filed Dec. 1, 1942   2 Sheets-Sheet 2

Inventor
Lawrence R. Buckendale
Beverly W. Keese
By Strauch & Hoffman
Attorneys

Patented Apr. 30, 1946

2,399,201

UNITED STATES PATENT OFFICE 2,399,201

POWER TRANSMITTING MECHANISM

Lawrence R. Buckendale, Detroit, Mich., and Beverly W. Keese, Oshkosh, Wis., assignors to The Timken-Detroit Axle Company, Detroit, Mich., a corporation of Ohio Application December 1, 1942, Serial No. 467,524

7 Claims. (Cl. 74—389)

This invention relates to power transmitting mechanisms, and more particularly to auxiliary transmissions or transfer cases for transmitting power from a prime mover to two or more drive axles of an automotive vehicle, in which the axles are of the hypoid type and the transfer case is operable to rotate the hypoid pinions in opposite directions, permitting interchangeable front and rear axles to be used, by merely rotating the axles through one hundred and eighty degrees in a vertical plane, although it is not limited to such use.

While transfer cases of this general character have been heretofore proposed, they are open to the disadvantages that they are of complicated design, embodying a multiplicity of shafts rotatable about four or more spaced axes; are bulky and take up valuable space in the vehicle chassis; and also are not readily convertible to conventional bevel gear axle drives, in which the pinion shafts of the axles are rotated in the same direction.

We have found that by providing a basic three-shaft transfer case with a split or sectional final drive shaft, and journalling the shaft sections in a support located inside the case, and providing a bevel gear assembly for rotating the final drive shaft sections in opposite directions, a thoroughly practical transfer case of rugged compact construction is secured, which will efficiently transmit power to reversed hypoid axles, and that by providing the transfer case with a third driven shaft, and aligning it with the drive shaft and driving it in the same direction as one of the split shaft sections, it may be employed to transmit power to a third drive axle. Also, by incorporating certain other novel features in the design of the transfer case, it may be readily changed over to embody a final drive shaft assembly having two axle driving shaft sections rotatable in the same direction, permitting ready conversion to a transfer case for driving conventional bevel gear axles, and yet retaining the basic three-shaft design of transfer case.

It is accordingly the major object of this invention to provide a novel transfer case of compact, rugged design, embodying shafts rotatable about three spaced axes, which will efficiently transmit power in opposite directions to the pinion shafts of hypoid axles, and which may be converted for use with conventional bevel gear axles, in which the shafts are rotatable in the same direction.

A further important object is to provide a transfer case having a drive shaft and a countershaft, with a novel driven shaft assembly disposed to one side of the countershaft and made up of two axially aligned sections, one of which derives power from the countershaft and the other is driven by a bevel gear assembly and transmits power between the driven shaft sections in opposite directions, for reversely rotating motor vehicle drive axle pinion shafts.

Another object is to provide a novel transfer case having a driven shaft assembly made up of a pair of aligned shafts mounted for independent rotation in a housing, with each of their neighboring ends journalled in a bearing inside the housing and having means for transmitting power from one shaft to the other.

A further object is to provide a novel transfer case having a drive shaft deriving power from the vehicle engine, and which may be used either: (1) to drive the pinion shafts of the front and rear drive axles of a four-by-four vehicle in opposite directions; (2) to drive the pinion shafts of the two rear driving axles of a four-by-six vehicle either in the same or in opposite directions by mounting it respectively ahead of, or between, the two rear driving axles; (3) to drive the pinion shaft of the front axle of a six-by-six vehicle in one direction and the pinion shafts of the two rear axles in the opposite direction, with one of the rear axle driving shafts aligned with the drive shaft and the other rear axle driving shaft aligned with the front axle driving shaft; and which may also be modified, by a minimum of interchange of parts, to provide a pair of aligned axle driving shafts which are rotatable in the same direction.

Another object is to provide a novel drive mechanism for dual rear drive axle vehicles embodying a transfer case disposed between the axles and transmitting power in opposite directions to the axle pinion shafts.

Further subordinate objects are to improve and refine certain other features of the transfer cases heretofore proposed; to provide an improved declutching mechanism for interrupting the drive to certain of the shafts; to provide improved lubrication means for insuring lubrication of bearings and other parts; and to provide novel bearing and support assemblies for journalling a pair of driven shafts for independent rotation in a housing.

Further objects will become apparent as the specification proceeds in conjunction with the annexed drawings, and from the appended claims.

Figure 1:
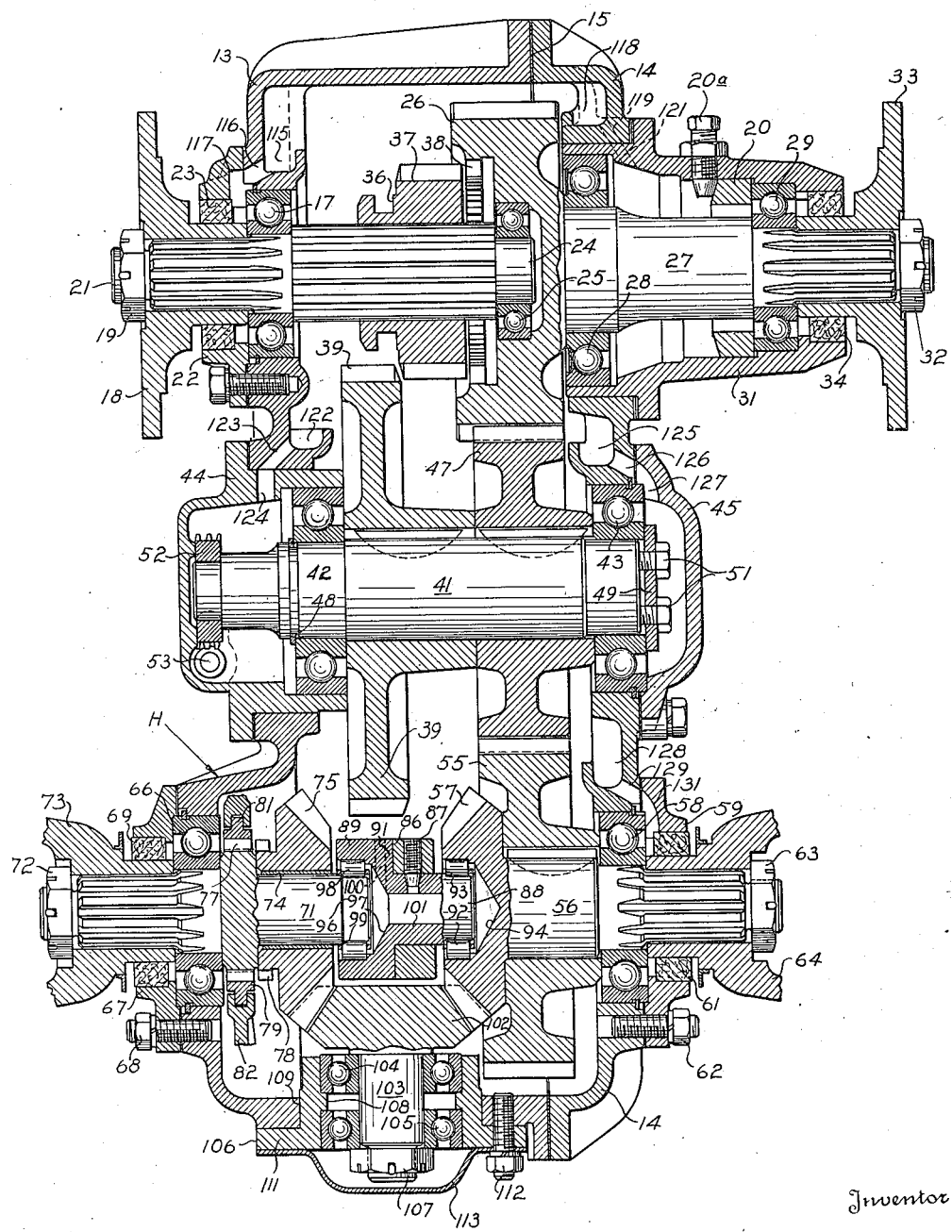
Figure 1 is a longitudinal sectional view through a transfer case embodying the invention, taken substantially on the line 1—1 of Figure 3, looking in the direction of the arrows.
Figure 2:
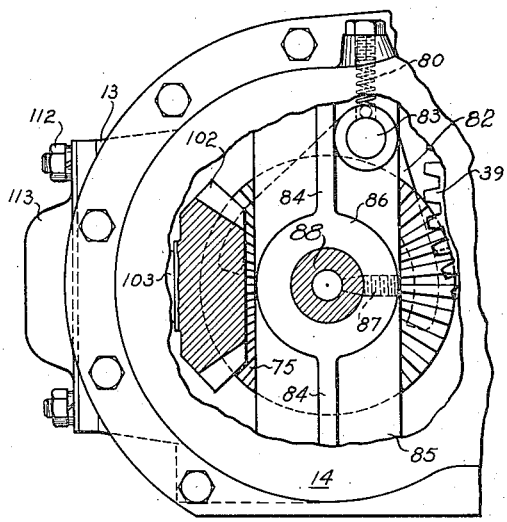
Figure 2 is a fragmental right-hand end view of the transfer case illustrated in Figure 1, with the housing partially broken away to illustrate the support for the neighboring ends of the driven or output shaft sections.
Figure 3:
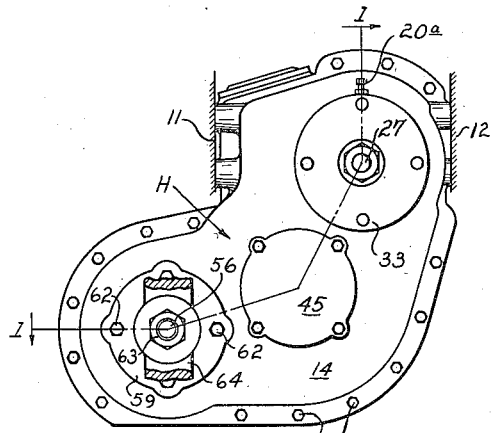
Figure 3 is a right-hand end view of a transfer case shown in Figure 1 on a reduced scale.

With continued reference to the drawings, in which like reference characters have been employed to designate like parts throughout several views thereof, and referring particularly to Figures 1, 2 and 3, the transfer case of the invention is mounted in a housing H, rigidly secured to longitudinal vehicle frame members 11 and 12 by cap screws or the like in well known manner. It will be noted that this housing is of substantially L-shaped form, having a short upper vertical portion and a lower horizontal portion of substantially the same length and width as said upper portion. Thus, the vertical overall dimension of the housing is reduced to a minimum, assuring adequate road clearance in vehicles having a low center of gravity.

The housing is made up of a deep section or casing 13, and a mating shallow section or cover 14, which are rigidly secured together along a transverse plane 15, by cap screws 16. Journalled in a bearing 17 in one wall of the housing, and having a universal joint flange 18 splined thereon and secured by a nut 19, is a drive or input shaft 21 which is preferably substantially aligned with the vehicle transmission or other source of power. Bearing 17 is held in place by means of a bolted cap 22 carrying a grease seal 23, the inner race of bearing 17 being clamped between a shoulder on the shaft and the hub or universal joint flange 18.

The other end of shaft 21 is provided with a reduced portion 24 which is journalled in a bearing 25 carried in a recess in a gear 26. The latter is provided with an integral shaft portion 27 journalled in bearings 28 and 29 carried in a sleeve 31 bolted to the housing cover. The outer race of bearing 29 is locked against displacement by means of a ring 20 and a cooperating set screw and lock nut assembly 20a. Splined on the end of shaft 27 and secured by a nut 32, is a universal joint flange 33 from which power may be transmitted to a drive axle, in a manner to be hereinafter pointed out. A seal 34, carried by sleeve 31, and cooperating with the hub of flange 33, seals the part against lubricant leaking.

Slidably splined upon shaft 21, and having a shifter yoke groove 36, is a spur gear 37, which is selectively meshable either with a series of internal teeth 38 in gear 26, for high or direct speed operation or with a spur gear 39 keyed to a countershaft 41, for low or geared speed operation. It is to be understood that any well known suitable shifter mechanism may cooperate with yoke groove 36 of gear 37 to shift it from the neutral position illustrated in Figure 1 into the high speed position or the low speed position, a specific disclosure thereof being omitted to simplify the disclosure.

Shaft 41 is mounted for rotation in bearings 42 and 43 mounted in a closure cap 44, and in cover 14 of the housing respectively, bearing 43 being maintained in place by a bolted closure cap 45. The inner races of bearings 42 and 43, together with the hub of gear 39 and the hub of a second countershaft gear 47, are clamped between a split ring 48, sprung into a groove in shaft 41, and a plate 49 by means of cap screws 51. Also keyed to shaft 41 is a speedometer drive worm 52 meshing with a worm gear 53 for driving the vehicle speedometer in well known manner.

We have found that by providing the transfer case structure just described with the novel split or sectional output shaft assembly that will now be described in detail, it is possible to drive inverted hypoid axles in opposite directions efficiently with the basic three-shaft case disclosed, and yet the mechanism takes up substantially no more space than a conventional three-shaft transfer case in which both shaft sections are rotated in the same direction. Also, the structure lends itself readily to conversion into a transfer case having aligned concentric output shafts rotatable in the same direction, in which most of the parts of the illustrated transfer case may be used, and which retains its three-shaft character and the same shaft center relationship.

Referring now more particularly to Figures 1 and 2, countershaft gear 47 constantly meshes with a gear 55 keyed to shaft section 56 of a bevel gear 57, so that shaft 56 is constantly rotated in the same direction as shaft 27, and gears 26 and 55 are preferably the same diameter so that their respective shafts 27 and 56 are driven at synchronous speeds.

Shaft 56 is journalled in a bearing 58 carried by housing cover 14, and is secured in place by a cap 59 carrying a seal 61 and secured to the housing cover by stud and nut assemblies 62. Splined on the end of shaft 56, and secured by a nut 63, is a universal joint member 64, whose hub cooperates with seal 61. Member 64 may be coupled to drive an axle pinion in the manner to be pointed out later.

Figure 4:
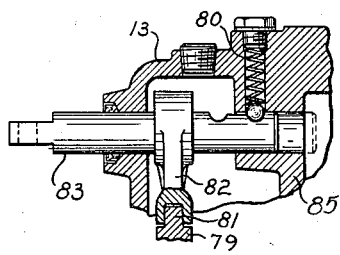
Figure 4 is a fragmental sectional view of the shifter mechanism for the clutch shown in Figure 1.

Concentrically disposed with shaft 56, and journalled in a bearing 66 in housing section 13 which is secured in place by a cap 67 and stud and nut assemblies 68, is a second driven or output shaft 71. Splined to shaft 71, and secured by a nut 72, is a universal joint member 73, which may be coupled by suitable shafting to a vehicle front drive axle or to the forward axle of a multi rear axle assembly, as will be hereinafter pointed out. A seal 69 carried by cap 67 cooperates with the hub of member 73. Journalled on shaft 71, by means of a bushing 74, is a bevel gear 75, which is preferably the same size as bevel gear 57, so as to produce equal and opposite rotation of the output shafts. Shaft 71 and gear 75 carry matching clutch teeth 77 and 78, respectively, and an internally toothed clutch member 79 is axially slidable upon teeth 77 and may be selectively brought into mesh with teeth 78, for coupling gear 75 to shaft 71. Clutch member 79 has a peripheral flange 81 fitting in a shifter yoke 82, and the latter is mounted on a shaft or shifter rail 83 (as seen in Figures 2 and 4) for axial shifting movement in the housing to bring the clutch into and out of engagement with teeth 78 to connect gear 75 to disconnect it from shaft 71, as may be desired. A spring loaded detent assembly 80, cooperating with notches in the shifter rail, yieldingly holds the parts in either shifted position. Shaft or rail 83 may be shifted by any suitable control device (not shown) operated from the vehicle cab.

The neighboring ends of shafts 71 and 56 are supported in novel manner in the housing by a common support and bearing assembly of novel construction, which maintains the shafts in accurate alignment, takes up a minimum of space between the gears on the shafts and enables interchangeable bearing assemblies to be used.

Referring to Figure 2, a vertical support 85 extends transversely across and is supported at its ends by the opposite walls of housing section 13. Support 85 is provided with stiffening ribs 84, which merge into a central hub portion 86, disposed in accurate alignment with bearings 58 and 66, mounted in the housing side walls. Member 85 also supports one end of shifter rail 83, as seen in Figures 2 and 4.

Rigidly secured in hub 86, by means of a set screw 87, and having a reduced portion 88, and an enlarged portion 89 providing a shoulder seating against one face of the hub, is a shaft support 91.

Shaft 56 is journalled on member 91 by means of a plurality of race-less anti-friction rollers 92, having a spacer cage or retainer 93. Rollers 92 cooperate directly with reduced portion 88 of support 91 and with an internal race way provided in a recess 94 in shaft 56.

Shaft 71 is provided with a reduced portion 96 which projects into a recess 97 in support 91, and is journalled therein by a plurality of rollers 98 having a spacer cage 99. Member 91 is also preferably provided with a central passage 101 to provide free inter-communication of lubricant between the two bearings, and a radial port 100, into which lubricant adhering to gear 39 is adapted to be centrifugally thrown during operation.

From the above it will be evident that by the provision of the aligned power output shafts 71 and 56, having driving connection with the front and rear axles, respectively, I am able to employ a single counter-shaft, with a very compact arrangement of the power transmitting mechanism in a housing of minimum dimensions. Also, this aligned relation of said shafts makes it possible to locate the front and rear axle drive gearings on the center line of the vehicle, with a desirably small vertical or horizontal angularity of the propeller shaft connections.

Gears 57 and 75 constantly mesh with a bevel gear 102, having a shaft portion 103 journalled in a pair of anti-friction bearings 104 and 105, carried by a bearing sleeve 106. As seen in Figure 1, the bearings are maintained in adjusted position on shaft 103 by means of a nut 107, and the outer bearing races abut an internal shoulder 108 in the bearing sleeve.

Sleeve 106 is provided with an accurately formed piloting surface 109, snugly fitting an opening in housing section 13, and a flange 111 which is tightly secured to the housing by a plurality of stud and nut assemblies 112. A closure plate 113 fits over the outside of the flange and is also secured in place by the stud and nut assemblies.

Operation

With the parts in the positions shown in Figure 1, the transfer case is in neutral condition and shaft 21 merely idles in its bearings 17 and 21 and no power is transmitted to shafts 27, 56 or 71.

When gear 37 is shifted to the left in Figure 1, into mesh with gear 39, the transfer case is disposed in low or geared speed. Under these conditions gear 37, which is smaller than gear 39, drives the latter at reduced speed, and through countershaft gear 47, and gears 26 and 55, drives shafts 27 and 56 at synchronous speeds. With clutch 79 in the disengaged position shown, rotation of shaft 56 as just described, through gears 57 and 102 rotates gear 75 reversely to shaft 56, and it merely idles on its shaft. When it is desired to drive shaft 71, shift rail 83 is shifted to the right, to engage clutch 79 with teeth 78 of gear 75, whereupon shaft 71 is rotated at the same speed as shaft 56, but in the opposite direction.

When gear 37 is shifted to the right in Figure 1, into mesh with internal teeth 38 of gear 26, the parts are in high or direct drive condition, and gear 37, through teeth 38, drives shaft 27 at the same speed as drive shaft 21, and, through gears 47 and 55, synchronously drives shaft 56. Clutch 79 may be shifted when the parts are in the high speed ratio for either causing shafts 56 and 71 to be driven in opposite directions or for causing shaft 56 alone to be driven, at the same speed as the drive shaft 21.

Power may accordingly be transmitted at either the high or the low speed ratio to shaft 56, and clutch 79 is selectively shifted to drive one or both output shaft sections.

By making idler pinion 102 of small diameter than gears 57 and 75 the latter may be brought sufficiently close together to permit compact installation of the gears in a housing of substantially conventional size, but it is to be understood that the invention is not limited to any specific gear ratios. Also, by mounting gears 57 and 75 on shafts 56 and 71, respectively, in the locations disclosed, so as to be disposed either side of, and in nesting relationship with, gear 39 of the countershaft, (Figures 1 and 2) an extremely compact structure is realized.

Lubrication

Lubrication of all the parts is provided by maintaining lubricant at a predetermined level in the housing and providing lubricant pockets and ducts that will now be described to conduct lubricant to all of the bearings. Referring to Figure 1, spur gears 39, 47, 55 and 75 and bevel gears 57, 102 and 75 dip directly into the body of lubricant in the housing and are therefore adequately lubricated at all times. Gears 39 and 47 in turn adequately lubricate the teeth of gears 37 and 26, and adequate lubricant finds its way into bearing 25 by splash during low speed operation.

A pocket 115 on the side wall of housing section 13 traps lubricant splashed against the housing and finds its way through a duct 116 in the housing wall and a mating duct 117 in cap 22 to bearing 17. A similar pocket 118 in cover section 14 transmits lubricant through ducts 119 and 121 to bearings 28 and 29.

Countershaft bearing 42 is lubricated by a pocket 122 in the wall of housing 13 which communicates with a duct 123 in the housing side wall and a duct 124 in cap 44. Bearing 43 is lubricated by a similar pocket 125 communicating through a duct 126 in cover section 14 and a duct 127 in cap 45 with the bearing.

Bearing 58 for shaft section 56 is lubricated by a pocket 128 and communicating ducts 129 in cover section 12, and 131 in cap 59. A similar pocket and duct arrangement may be provided for bearing 66, but since this bearing only operates under load and when clutch 79 is engaged, the lubricant splashed from the gears is usually sufficient.

In the foregoing discussion of the various pockets it is to be understood that they are disposed substantially directly over their respective bearings, but that they have been shown out of their proper planes to simplify the disclosure. Roller bearings 92 and 98 are lubricated by splash from gear 39, the lubricant entering passage 100, which faces the gear, and freely passing through central bore 101 to both bearing assemblies.

Convertibility

If it is desired to convert the transfer case of the invention to one in which the two aligned output shafts rotate in the same direction, the construction of the parts permits this to be readily carried out without changing the basic three-shaft design. Shaft sections 56, 71 and 103 and their associated gears are removed and replaced by two plain shaft sections, one of which projects to the left through, and is journalled in, support 91, gear 55 being mounted upon one of the shaft sections, and clutch 79 being utilized to couple one shaft section to the projecting portion of the other when it is desired to drive both shaft sections synchronously.

Applications to vehicle drives

Figure 5:
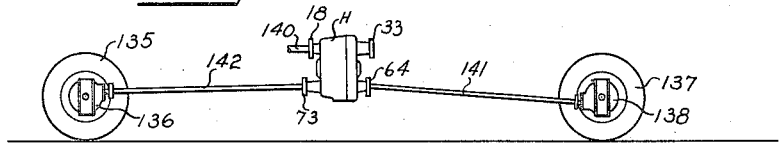
Figure 5 is a diagrammatic longitudinal sectional view illustrating the application of the transfer case of the invention to a four-wheel drive vehicle.

Referring now to Figure 5, we have diagrammatically illustrated a vehicle having front wheels 135 driven by a hypoid axle 136, and rear wheels 137 driven by a hypoid axle 138, it being observed that front and rear axles are rotated substantially 180° in a vertical plane so as to dispose the front propeller shaft 142 above the axis of the axle shafts, and the rear propeller shaft 141 below the axle shaft plane, requiring opposite direction of propeller shaft rotation. Power is transmitted to input shaft universal coupling 18 by means of a drive shaft 140. As seen in Figure 5, a propeller shaft 141 is connected to universal joint connection 64 of shaft 56, while propeller shaft 142 is connected to universal joint connection 73 of shaft 71. In this application of the invention universal joint flange 33 of shaft 27 is not untilized for transmitting power and if desired may be removed and the shaft capped over.

Figure 6:
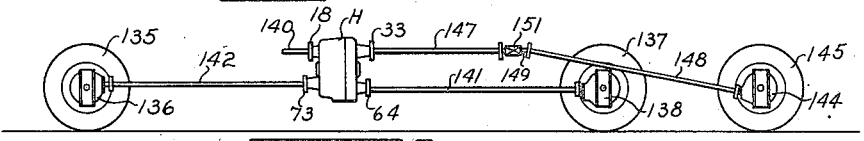
Figure 6 is a view similar to Figure 4 but illustrates the invention as being applied to a six-by-six vehicle drive.

In Figure 6 there is illustrated a six-by-six hypoid axle drive in which all of the driven shafts of the transfer case are utilized to transmit power. Front drive axle 136 is connected to universal joint coupling 73 by propeller shaft 139 as in Figure 4, while drive axle 138 is connected to output coupling 64 by propeller shaft 141. The vehicle is provided with an additional drive axle 144, having wheels 145, which is driven from universal joint coupling 33 of shaft 27 through a pair of propeller shafts 147 and 148 and a short shaft section 149 journalled in a support 151 carried by the vehicle frame.

Figure 7:
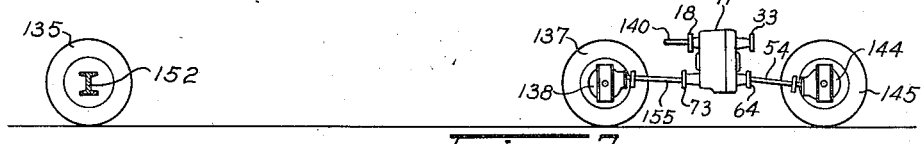
Figure 7 is a view similar to Figures 5 and 6, but illustrates a novel manner in which the transfer case of the invention may be applied to a six-by-four vehicle drive.

The invention may be applied to a six-by-four vehicle by merely omitting the front propeller shaft 142 in Figure 6 and using a dead front axle, or, if desired, the novel alternative drive shown in Figure 7 may be utilized. Referring to Figure 7, front wheels 135 are carried by a dead axle 152, and rear drive axle 138 of Figure 6 has been inverted so as to require reverse rotation. The transfer case is mounted between the drive axles on the vehicle frame in any suitable manner and joint couplings 64 and 73 of shafts 56 and 71 are coupled to axles 144 and 138 by short propeller shafts 154 and 155 respectively. Here again shaft 27 is not utilized for transmitting power and may be capped over if desired.

From the foregoing detailed disclosure of the invention it is apparent that we have provided a novel transfer case and vehicle drive mechanism particularly adapted for driving hypoid drive axles and embodying aligned output shaft sections rotatable in opposite directions, and a third output shaft for transmitting power to a third drive axle, which is of rugged and compact design and which will efficiently transmit power to two or more axles, and embodies a novel split output shaft assembly having means for journalling the two shaft sections in closely neighboring relationship for independent rotation in the housing, and yet which may be converted for use with conventional bevel gear axles with a minimum of rearrangement and replacement of parts.

While the invention has been illustrated as embodied in a two-speed transfer case, it is to be understood that it may be embodied in single speed transfer cases without departing from the spirit of the invention, and that while it is preferable to provide clutch 79 for disconnecting one set of driving wheels to save tire wear, the invention is also applicable to transfer cases in which the two shaft sections are constantly driven.

While we have shown the invention as being applied to axles requiring a one-to-one driving relationship of the propeller shafts, it is to be understood that it is also applicable to vehicle drives in which one axle has a different ratio than the other, by making gears 57 and 75 of different diameters and employing either an obliquely mounted idler gear, or two idler gears, rigidly connected together and each meshing with one of the different diameter output shaft gears, and it is to be understood that the appended claims embrace the invention when embodied in these forms.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power transmitting mechanism, a housing; a drive shaft mounted for rotation in said housing; a pair of axially aligned driven shafts mounted for rotation in said housing about an axis spaced from said drive shaft; a pair of spaced bevel gears mounted on the neighboring ends of said driven shafts and meshing with a third bevel gear mounted for rotation in said housing; and means for transmitting power from said drive shaft to one of said driven shafts, comprising a spur gear mounted for rotation about an axis parallel to said driven shafts and projecting into the space between said bevel gears carried by said driven shafts.

2. In a vehicle having a pair of driving axles; a transfer case for transmitting power from a prime mover to said axles, comprising a housing adapted to be mounted in the vehicle in cooperative relationship to said axles; a drive shaft journalled in said housing; three driven shafts journalled in said housing for rotation about substantially parallel axes; means for transmitting power from said drive shaft to said driven shafts, comprising a countershaft carrying a gear, gears on two of said driven shafts meshing with the gear on said countershaft; means for transmitting power from one of said two driven shafts to the third of said driven shafts and operable to rotate the latter in the opposite direction to the other of said driven shafts; and means for transmitting power from two of said driven shafts to said drive axles.

3. The vehicle drive mechanism defined in claim 2, wherein said vehicle is provided with a third drive axle and is connected to said third driven shaft.

4. In a power transfer mechanism for a plurality of vehicle drive axles, power input and output shafts axially aligned with each other, an additional pair of output shafts axially aligned with each other, each of said output shafts being adapted for driving connection with a different vehicle axle, power transmission gearing between said first named output shaft and one of the latter output shafts, and manually controllable means individual to the respective pairs of aligned shafts for establishing a power transmitting connection between the shafts in each pair.

5. The power transfer mechanism defined in claim 4, and a housing therefor having angularly related portions of substantially equal length.

6. In a power transmitting mechanism for front and rear hypoid gear driven axles in which the hypoid pinion shafts are driven in relatively opposite directions; power dividing means comprising a pair of coaxially aligned power output shafts for drive transmitting connection with the respective axle pinion shafts, a power driven shaft, a single counter-shaft between said latter shaft and the power output shafts, constantly meshed gears fixed to the driven shaft, countershaft and one of said output shafts, and manually controllable means operable to establish a driving connection between the opposed ends of said aligned shafts and to drive the other output shaft in a reverse direction to said first named output shaft.

7. The power transmitting mechanism defined in claim 6, and a substantially L-shaped housing therefor having a lower horizontally disposed portion in which said aligned output shafts are mounted below a horizontal plane intersecting the axis of the counter-shaft.

LAWRENCE R. BUCKENDALE.
BEVERLY W. KEESE.